(12) United States Patent
de Ruijter et al.

(10) Patent No.: US 9,736,709 B2
(45) Date of Patent: Aug. 15, 2017

(54) RECEIVER WITH FREQUENCY DEVIATION DETECTION CAPABILITY AND METHOD THEREFOR

(71) Applicant: Silicon Laboratories Inc., Austin, TX (US)

(72) Inventors: Hendricus de Ruijter, Sunnyvale, CA (US); Wentao Li, Mountain House, CA (US)

(73) Assignee: Silicon Laboratories Inc., Austin, TX (US)

( * ) Notice: Subject to any disclaimer, the term of this patent is extended or adjusted under 35 U.S.C. 154(b) by 204 days.

(21) Appl. No.: 14/500,382

(22) Filed: Sep. 29, 2014

(65) Prior Publication Data

US 2015/0092586 A1 Apr. 2, 2015

Related U.S. Application Data

(60) Provisional application No. 61/885,867, filed on Oct. 2, 2013.

(51) Int. Cl.
*H04L 12/26* (2006.01)
*G01R 31/08* (2006.01)
(Continued)

(52) U.S. Cl.
CPC .......... *H04W 24/08* (2013.01); *H04L 27/106* (2013.01); *H04L 27/12* (2013.01); *H04L 27/148* (2013.01)

(58) Field of Classification Search
CPC ....... H04L 27/10; H04L 27/12; H04L 27/106; H04L 27/148; H04L 27/14; H04W 24/08; H04B 1/16
See application file for complete search history.

(56) References Cited

U.S. PATENT DOCUMENTS 5,771,443 A * 6/1998 Nagano .................. G01R 23/02
375/224
8,411,799 B1 4/2013 Jones
(Continued)

FOREIGN PATENT DOCUMENTS

CA 2296209 A1 7/2001
EP 1148682 A2 10/2001
(Continued)

OTHER PUBLICATIONS

Silicon Laboratories Inc., "Si446x Wireless MBUS Receiver," AN662, Rev. 0.1 Feb. 2012, Feb. 2012, 56 pages.

(Continued)

*Primary Examiner* — Yemane Mesfin
*Assistant Examiner* — Abdelillah Elmejjarmi
(74) *Attorney, Agent, or Firm* — Polansky & Associates, P.L.L.C.; Paul J. Polansky

(57) ABSTRACT

A receiver includes an analog receiver and a digital processor. The analog receiver has an input for receiving a radio frequency (RF) signal, and an output for providing a digital intermediate frequency signal. The digital processor has an input for receiving the digital intermediate frequency signal, and an output for providing digital symbols. The digital processor measures peak-to-peak frequency deviation of the digital intermediate frequency signal, and performs a digital signal processing function on the digital intermediate frequency signal to provide the digital symbols based on the peak-to-peak frequency deviation so measured.

17 Claims, 6 Drawing Sheets

(51) Int. Cl.
*G06F 11/00* (2006.01)
*G08C 15/00* (2006.01)
*H04J 1/16* (2006.01)
*H04J 3/14* (2006.01)
*H04W 24/08* (2009.01)
*H04L 27/10* (2006.01)
*H04L 27/12* (2006.01)
*H04L 27/148* (2006.01)

(56) References Cited

U.S. PATENT DOCUMENTS

| | | |
|---|---|---|
| 2003/0091127 A1 | 5/2003 | Jenses |
| 2003/0203729 A1 | 10/2003 | Hansen et al. |
| 2004/0218686 A1 | 11/2004 | Pastemak |
| 2006/0226897 A1 | 10/2006 | deRuijter |
| 2010/0158165 A1* | 6/2010 | Myong ............... H04L 27/0014 375/344 |
| 2012/0164966 A1 | 6/2012 | Casagrande |
| 2015/0030061 A1 | 1/2015 | de Ruijter et al. |

FOREIGN PATENT DOCUMENTS

| | | | |
|---|---|---|---|
| EP | 0732020 B1 | 8/2002 | |
| EP | 1299977 A | 4/2003 | |
| EP | 1525728 A | 4/2005 | |
| GB | EP0732020 B1 * | 8/2002 | ............. H04L 27/14 |
| WO | 0205503 A1 | 1/2002 | |
| WO | WO0205503 A1 | 1/2002 | |
| WO | 2004010666 A1 | 1/2004 | |

OTHER PUBLICATIONS

Silicon Laboratories Inc., "Wireless M-BUS Software Implementation," AN451, Rev. 0.1 Feb. 2010, Feb. 2010, 14 pages.
International Search Report for United Kingdom Application No. GB1406118.8 mailed Sep. 23, 2014; pp. 1-5.

* cited by examiner

RECEIVER WITH FREQUENCY DEVIATION DETECTION CAPABILITY AND METHOD THEREFOR

This application claims priority to provisional application no. 61/885,867, filed Oct. 2, 2013, entitled "Receiver with Frequency Deviation Detection Capability and Method Therefor," invented by Hendricus de Ruijter and Wentao Li which is hereby incorporated by reference herein in its entirety.

FIELD OF THE DISCLOSURE

The present disclosure relates generally to receivers and, more particularly to a receiver for wireless communication signals such as multi-level frequency shift keying (MFSK) signals.

BACKGROUND

Wireless RF receivers are used in a wide variety of applications such as smart metering, remote control, home security and alarm, telemetry, garage and gate openers, remote keyless entry, and the like. As used herein, a "radio frequency" signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc.

One common type of RF receiver is a frequency-shift keying (FSK) receiver that is compatible with the industrial, scientific and medical (ISM) radio bands in the 119 to 1050 megahertz (MHz) range. ISM radio bands are portions of the radio spectrum reserved internationally for the use of RF energy for industrial, scientific and medical purposes other than communication. One signaling system that uses FSK is the Meter-Bus (MBUS) standard, no. EN 13757-4. The draft MBUS-2013 standard defines a mode known as mode N that encodes data using four-level Gaussian frequency shift keying (4GFSK). In addition, the draft MBUS-2013 provides a large, ±30% frequency tolerance. The use of four levels with a wide frequency tolerance makes symbol determination difficult.

BRIEF DESCRIPTION OF THE DRAWINGS

The present disclosure may be better understood, and its numerous features and advantages made apparent to those skilled in the art by referencing the accompanying drawings, in which.

In the following description, the use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
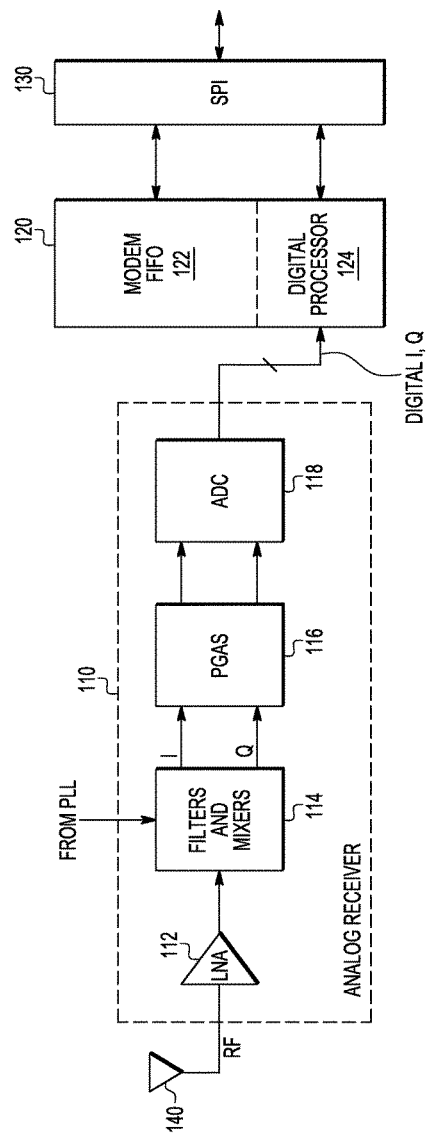
FIG. 1 illustrates in partial block diagram and partial schematic form a receiver according to one embodiment.

FIG. 1 illustrates in partial block diagram and partial schematic form a receiver 100 according to one embodiment. Receiver 100 generally includes an analog receiver 110, a digital channel circuit 120, a serial peripheral interface (SPI) controller 130 labeled "SPI", and an antenna 140.

Analog receiver 110 includes a low noise amplifier 112 labeled "LNA", a multiple number of filters and mixers 114, a multiple number of programmable gain amplifiers 116 labeled "PGAs", and an analog-to-digital converter (ADC) 118. LNA 112 has an input for receiving a radio frequency broadcast signal labeled "RF" and an output. Multiple filters and mixers 114 has a first input connected to the output of LNA 112, a second input connected to an output of a phase locked loop (not shown) for receiving a local oscillator signal, and a first output for providing an in-phase intermediate frequency (IF) output labeled "I", and a second output for proving a quadrature IF output labeled "Q". Each of PGAs 116 has a first input connected to the first output of multiple filters and mixers 114 for receiving the I signal, and a second input connected to the second output of multiple filters and mixers 114 for receiving the Q signal, a first output, and a second output. ADC 118 has a first input connected to the first output of multiple PGAs 116, a second input connected to the second output of multiple PGAs 116, and an output for providing a set of signals labeled "DIGITAL I, Q".

Digital channel circuit 120 includes a modulator-demodulator first-in, first-out buffer 122 labeled "MODEM FIFO", and a digital processor 124. MODEM FIFO 122 is connected to SPI controller 130. Digital processor 124 has an input connected to the output of ADC 118 for receiving the DIGITAL I, Q signals, and a bidirectional port.

SPI controller 130 is connected to MODEM FIFO 122, has a first input connected to the output of digital processor 124, is connected to digital processor 124, and is adapted to connect to a set of SPI peripherals (not shown).

Antenna 140 is connected to and delivers the RF signal to the input of LNA 112.

In operation, LNA 112 receives the RF signal from antenna 140 and provides an amplified internal signal to filters and mixers 114. In one embodiment, receiver 100 supports the MBUS-2013 draft standard, including mode N, which uses four-level Gaussian frequency shift keying (4GFSK). A local oscillator within receiver 100 (not shown) provides mixing signals to filters and mixers 114. Filters and mixers 114 convert the amplified internal signal into in-phase (I) and quadrature (Q) components at a low IF and then filter the I and Q signals in corresponding low pass filters that reject frequencies above the selected IF. The signal levels are adjusted in PGAs 116 using well-known AGC techniques. ADC 118 converts the outputs of PGAs 116 to the DIGITAL I, Q signals.

MODEM FIFO 122 exchanges data through SPI controller 130 with, for example, a host microcontroller unit (MCU), not shown, collects receive data in a FIFO buffer, stores transmit data in the FIFO buffer. MODEM FIFO 122 is a 128 kilobyte (kB) FIFO that supports different configurations. In one configuration, MODEM FIFO 122 operates as a 64 kB transmit FIFO and a 64 kB receive FIFO. In another configuration, MODEM FIFO 122 operates as a 128 kB receive FIFO. In yet another configuration, MODEM FIFO 122 operates as a 128 kB transmit FIFO. Digital processor 124 processes the DIGITAL I, Q signals in the digital domain to reliably detect FM signals in a variety of formats including 4GFSK symbols over the entire MBUS-2013 frequency tolerance, in a manner that will be described further below.

Figure 2:
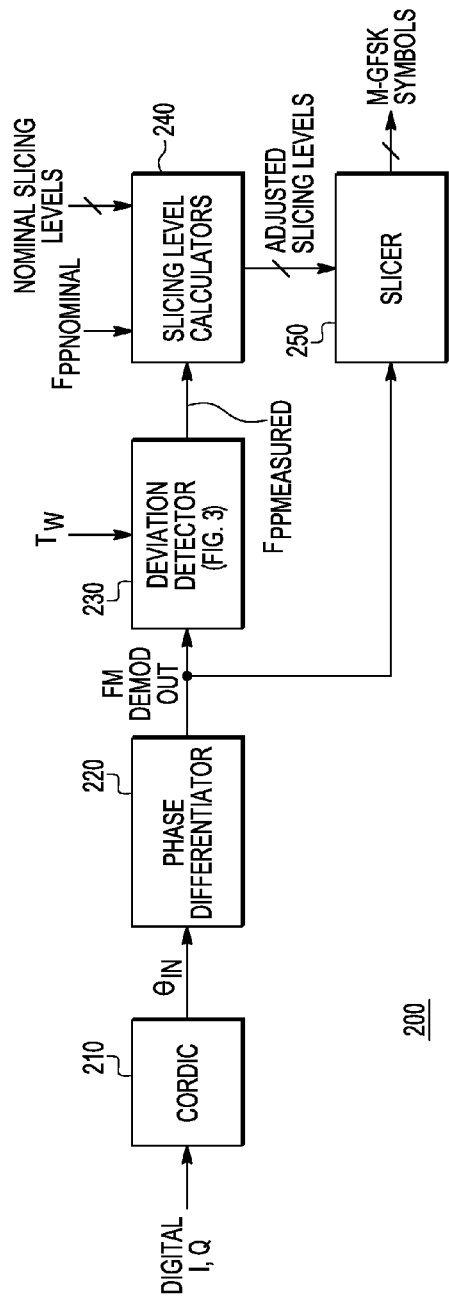
FIG. 2 illustrates in block diagram form a symbol decoder that may be used in the digital processor FIG. 1 in accordance with one embodiment.

FIG. 2 illustrates in block diagram form a symbol decoder 200 that may be used in digital processor 124 of FIG. 1 in accordance with one embodiment. Symbol decoder 200 includes a Coordinate Rotation Digital Computer ("CORDIC") 210, a phase differentiator 220, a deviation detector 230, a slicing level calculator 240, and a slicer 250. CORDIC 210 has an input for receiving the digital I and Q signals from ADC 118, and an output for providing a signal labeled "$\Theta_{IN}$". Phase differentiator 220 has an input connected to the output of CORDIC 210 for receiving the $\Theta_{IN}$ signal, and an output for providing a signal labeled "FM DEMOD OUT". Deviation detector 230 has an input connected to the output of phase differentiator 220 for receiving the FM DEMOD OUT signal, a control input for receiving a control signal labeled "$T_W$", and an output for providing a signal labeled "$F_{PPMEASURED}$". Slicing level calculator 240 has a first input connected to the output of deviation detector 230, a second input for receiving a signal labeled "$F_{PPNOMINAL}$", a third input for receiving a set of signals labeled "NOMINAL SLICING LEVELS", and an output for providing a set of signals labeled "ADJUSTED SLICING LEVELS". Slicer 250 has a first input connected to the output of phase differentiator 220, a second input connected to the output of slicing level calculator 240, and an output for providing a signal labeled "M-GFSK SYMBOLS".

In operation, symbol decoder 200 forms a portion of digital processor 124 that receives down converted digital I and Q signals, and in one supported mode of receiver 100 outputs GFSK symbols in one of four states. CORDIC 210 calculates a phase of the DIGITAL I, Q signals and provides signal $\Theta_{IN}$ to phase differentiator 220. Phase differentiator 220 provides the FM DEMOD OUT signal to deviation detector 230 in response to the rate of change of $\Theta_{IN}$. The FM DEMOD OUT signal has an amplitude proportional to the rate of change of $\Theta_{IN}$ over a symbol time. In the embodiment shown in FIG. 2, deviation detector 230 is responsive to an activation of the $T_W$ control signal to measure the peak-to-peak frequency deviation $F_{PPMEASURED}$ during a period defined by signal $T_W$. Digital processor 124 activates TW during a part of the preamble period, since the preamble symbols corresponding to both the highest frequency deviation and the lowest frequency deviation. $F_{PPMEASURED}$ is thus a measure of the actual frequency deviation within the specified tolerance. Slicing level calculator 240 adjusts the NOMINAL SLICING LEVELS in response to FPPMEASURED in a manner that will be described further below.

Slicer 250 determines which of the possible frequency shift symbols is indicated by the FM DEMOD OUT signal, for example which of four frequency shift symbols is indicated for 4GFSK. In the MBUS-2013 draft standard, the allowed frequency deviation is specified with 30% tolerance. In other words, the frequency deviation can range between 70% and 130% of the nominal frequency deviation.

In 4GFSK receive mode (known as N2g mode), this error will lead to eye closure and ultimately failure to decode the proper 4GFSK symbols. However deviation detector 230 senses the range of frequency deviations during the preamble, and slicing level calculator 240 adjusts the slicing levels used to separate the frequency shifts accordingly. Thus symbol decoder 200 provides robust and accurate decoding of 4GFSK symbols.

In other embodiments, the technique described above can be used in other communication systems that use more than two frequencies. These systems use a modulation technique known generally as multiple frequency shift keying (MFSK). An example would be 8GFSK, which uses eight frequencies to encode log2(8)=3 bits and which uses 8−1=7 different slicing levels.

Figure 3:
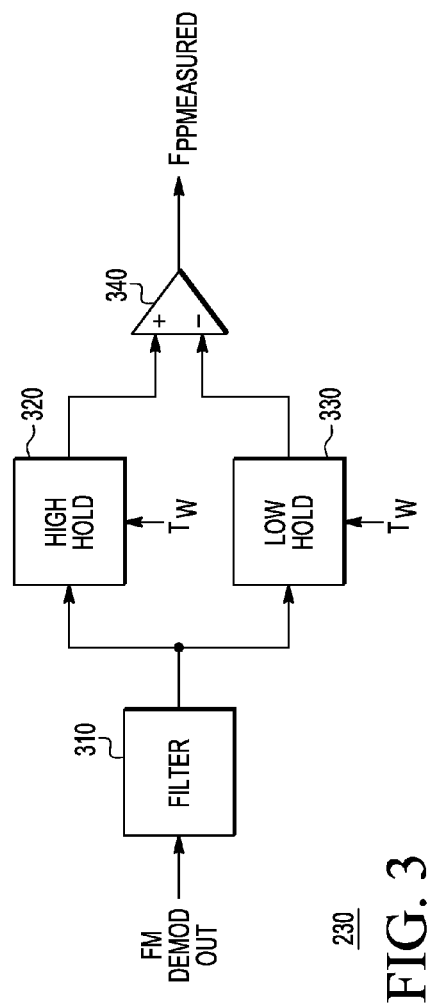
FIG. 3 illustrates in block diagram form the deviation detector of FIG. 2.

FIG. 3 illustrates in block diagram form deviation detector 230 of FIG. 2. Deviation detector 230 includes a filter 310, a high hold register 320 labeled "HIGH HOLD", a low hold register 330 labeled "LOW HOLD", and a subtractor 340. Filter 310 has an input for receiving the FM DEMOD OUT signal, and an output. High hold register 320 has a first input connected to the output of filter 310, a second input for receiving the $T_W$ signal, and an output. Low hold register 330 has a first input connected to the output of filter 310, a second input for receiving the $T_W$ signal, and an output. Subtractor 340 has a first input connected to the output of high hold register 320 labeled "+", a second input connected to the output of low hold register 330 labeled "−", and an output.

Filter 310 receives the FM DEMOD OUT signal and filters it so that high hold register 320 and low hold register 330 can properly update (by logic not shown in FIG. 3) the high and low values encountered during a timing window. Thus the logic increases or decreases the values in high hold register 320 and low hold register 330, respectively, if filter 310 provides a value that exceeds, or is less than, the previous values stored by high hold register 320 and low hold register 330, respectively, within a $T_W$ period. $T_W$ defines a timing window and the deactivation of the $T_W$ signal causes high hold register 320 and low hold register 330 to stop updating and to freeze their values. Subtractor 340 determines $F_{PPMEASURED}$ as the difference between a measured high frequency deviation and a measured low frequency deviation after the $T_W$ period. The $F_{PPMEASURED}$ value indicates peak-to-peak deviation. This measurement is insensitive to frequency offset so that the deviation measurement may be obtained before automatic frequency compensation (AFC) is enabled.

As noted above, digital processor 124 activates the $T_W$ signal during the preamble period in which the preamble includes a pattern of symbols corresponding to the highest frequency and the lowest frequency. The difference is a measure of the "outer deviation" and can be used to scale all the slicing levels except the middle level. $T_W$ can be set to an appropriate amount, e.g. two bit times or longer. Moreover in other embodiments it is possible to obtain better precision by sampling multiple values and applying averaging to filter out noise.

In 4GFSK the preamble pattern includes the highest frequency symbol (10) and the lowest frequency symbol (00), the high hold register 320 and low hold register 330 indicate the actual frequency deviations between the highest and lowest symbol frequency shifts. Slicing level calculator 240 determines the ratio between the measured frequency deviation ($F_{PPMEASURED}$) and the nominal peak-to-peak frequency deviation ($F_{PPNOMINAL}$) and adjusts the nominal slicing levels using this factor to provide the ADJUSTED SLICING LEVELS. Mathematically, this relationship can be expressed as:

$$\text{ADJUSTED SLICING LEVEL} = \frac{F_{PPMEASURED}}{F_{PPNOMINAL}} * \text{NOMINAL SLICING LEVEL} \quad [1]$$

Figure 4:
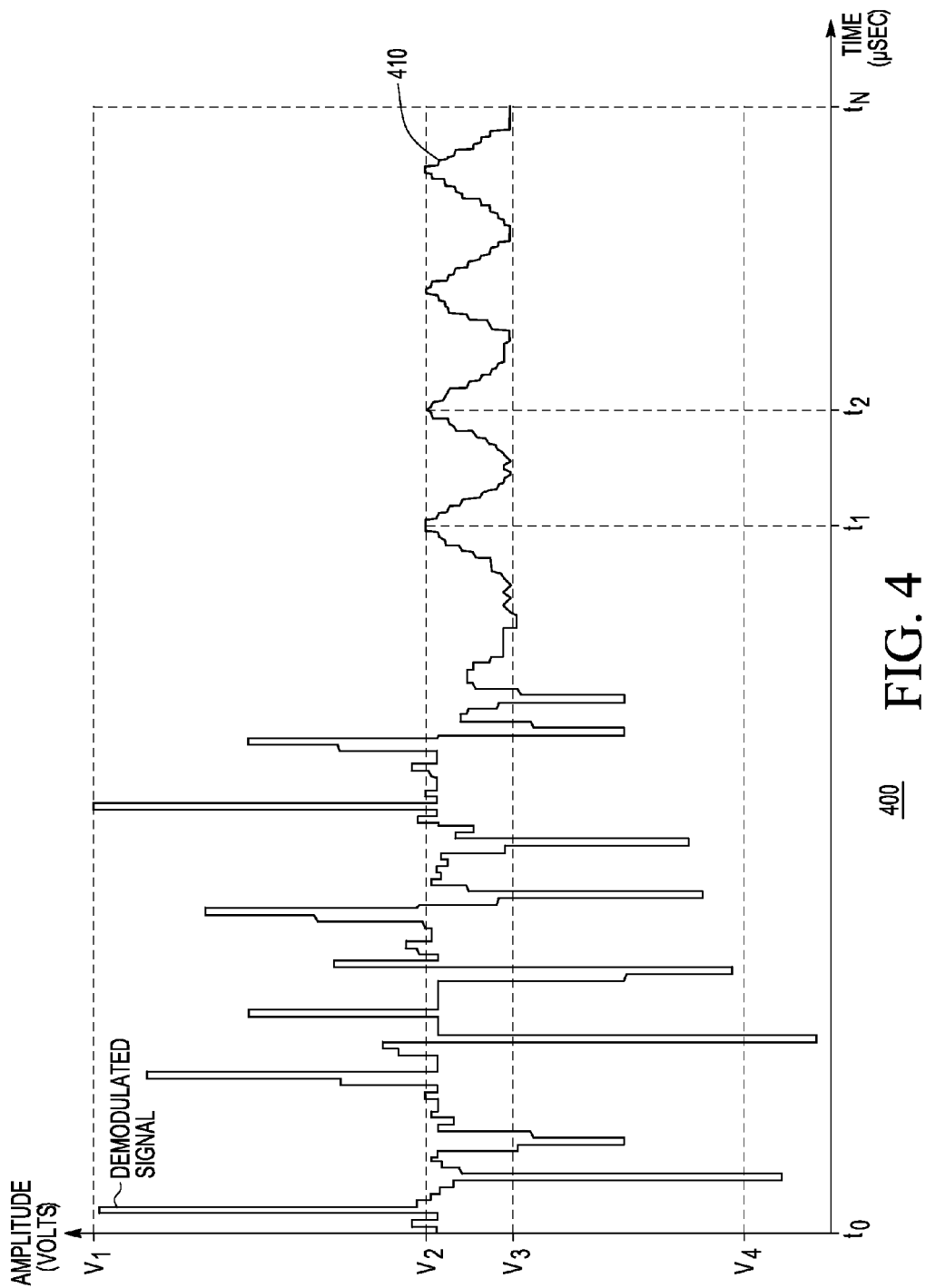
FIG. 4 illustrates a timing diagram of the signals received by the receiver of FIG. 1.

FIG. 4 illustrates a timing diagram 400 of signals received by the receiver of FIG. 1. The horizontal axis represents time in microseconds, and the vertical axis represents the amplitude of various signals in volts. Timing diagram 400 illustrates a waveform 410 corresponding to the FM DEMOD OUT signal. The horizontal axis illustrates four particular time points of interest labeled "$t_0$", "$t_1$", "$t_2$", an "$t_N$".

As shown in FIG. 4, the time period from $t_0$ to $t_1$ is an inter-frame period and during this time the DEMODULATED SIGNAL is dominated by additive white Gaussian noise (AWGN). This time period is characterized by abrupt changes in amplitude that correspond to discontinuous changes in frequency referred to as "phase clicks".

In particular during the time period after $t_1$ and continuing through time point $t_N$, waveform 410 is no longer dominated by AWGN but instead includes a time-varying waveform. Digital processor 124 detects the start of the preamble period by, for example, detecting an absence of phase clicks that are characteristic of demodulated AWGN. Digital processor 124 subsequently activates deviation detector 230 and slicing level calculator 240 to adjust the slicing levels for the reception of an MBus-2013 frame. The start of preamble detection and deviation detection may work in parallel such that when the preamble is detected, the slicer thresholds can be changed immediately thereafter which will help when the preamble length is short.

Figure 5:
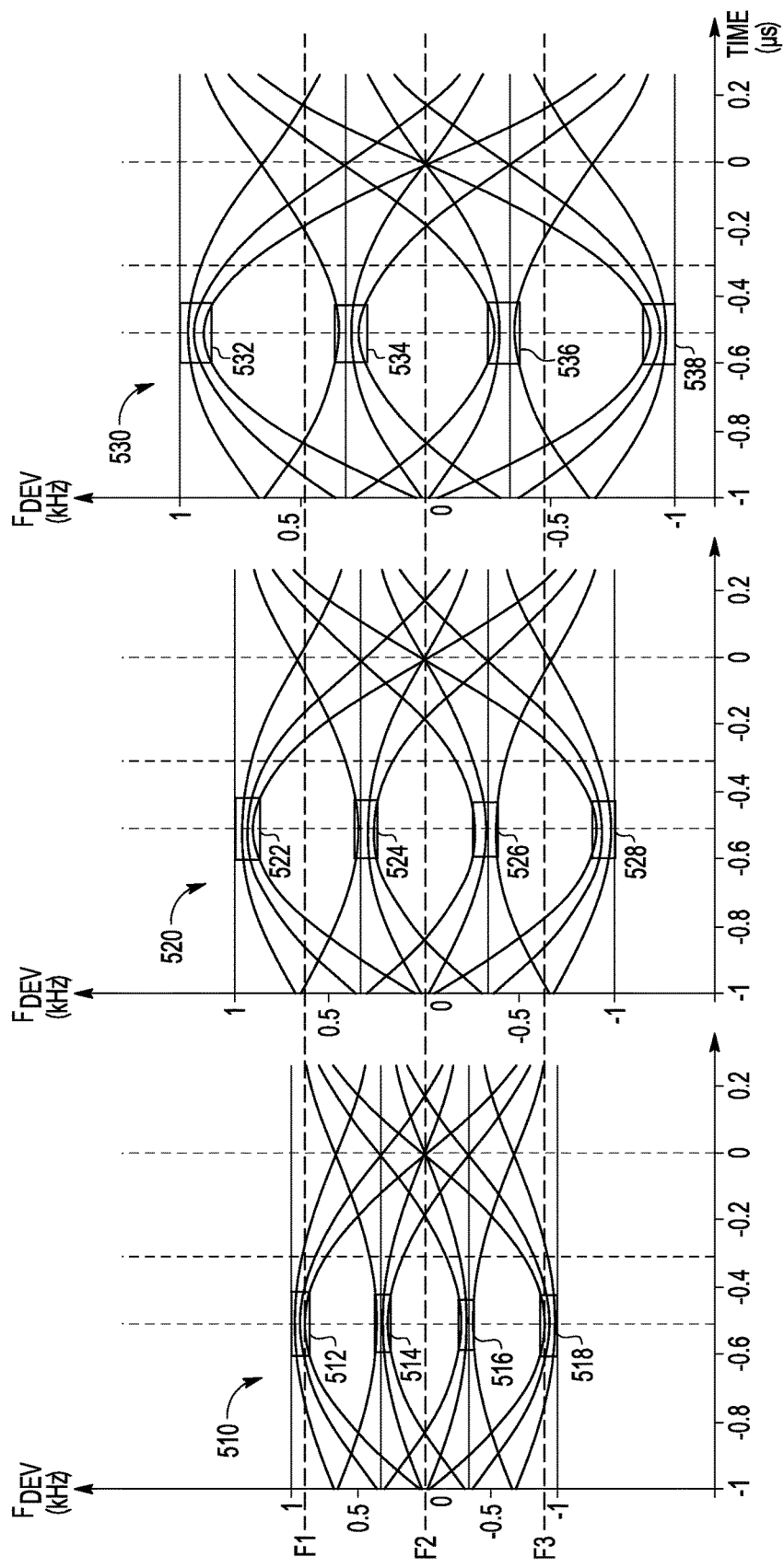
FIG. 5 illustrates a timing diagram of the operation of an uncompensated 4GFSK symbol decoder.

FIG. 5 illustrates a timing diagram 500 of the operation of an uncompensated 4GFSK symbol decoder. In FIG. 5, the horizontal axis represents time in symbols times (Ts), and the vertical axis represents frequency deviation in kilohertz (kHz). Also shown along the vertical axis are normalized values in which the peak-to-peak frequency deviation $F_{DEV}$ extends from +1 to −1. For a 4GFSK system that encodes two bits as one of four frequencies, the frequencies are evenly spaced such that the high frequency is at +1 normalized deviation, the mid-high frequency is at about +0.33 normalized deviation, the mid-low frequency is at about −0.33 normalized deviation, and the low frequency is at −1 normalized deviation.

FIG. 5 illustrates three sets of waveforms, including a waveforms set 510 corresponding to a 70% frequency deviation, a waveform set 520 representing nominal frequency deviation, and a waveform set 530 representing a 130% deviation. A given point in time designated 0 symbol times corresponds to a transition between a prior symbol and a subsequent symbol. The prior symbol is represented between −1.0 and 0 symbol times, and the subsequent symbol begins at 0 symbol times. At about −0.5 symbol times, the previous symbol reaches its desired frequency and is encoded in one of four frequencies, represented in waveform set 510 as deviations 512, 514, 516, and 518, in waveform set 520 as deviations 522, 524, 526, and 528, and in waveform set 530 as deviations 532, 534, 536, and 538. FIG. 5 shows three slicing levels, a first slicing level labeled "F1" that is used to discriminate between high frequency and a mid-high frequency, a second slicing level labeled "F2" that is used to discriminate between the mid-high frequency and a mid-low frequency, and a third slicing level labeled "F3" that is used to discriminate between the mid-low frequency and a low frequency. As shown in waveform set 520, F1, F2, and F3 can be set to hit the center or "eye" of the nominal frequency deviations.

However setting the frequency deviations for the nominal levels may result in failure to correctly decode the symbol. In waveform set 510, F1 is just below deviation 512 which is the highest frequency deviation in waveform set 510, and F3 is just above the lowest frequency deviation. The lack of margin will cause errors in the presence of real-world conditions such as noise, clock jitter, etc. Likewise in waveform set 530, F1 is just above deviation 534 which is the medium-high frequency deviation, and F3 is just below deviation 536, which the mid-low frequency deviation. Again, the lack of margin will cause errors in the presence of real-world conditions such as noise, clock jitter, etc.

Figure 6:
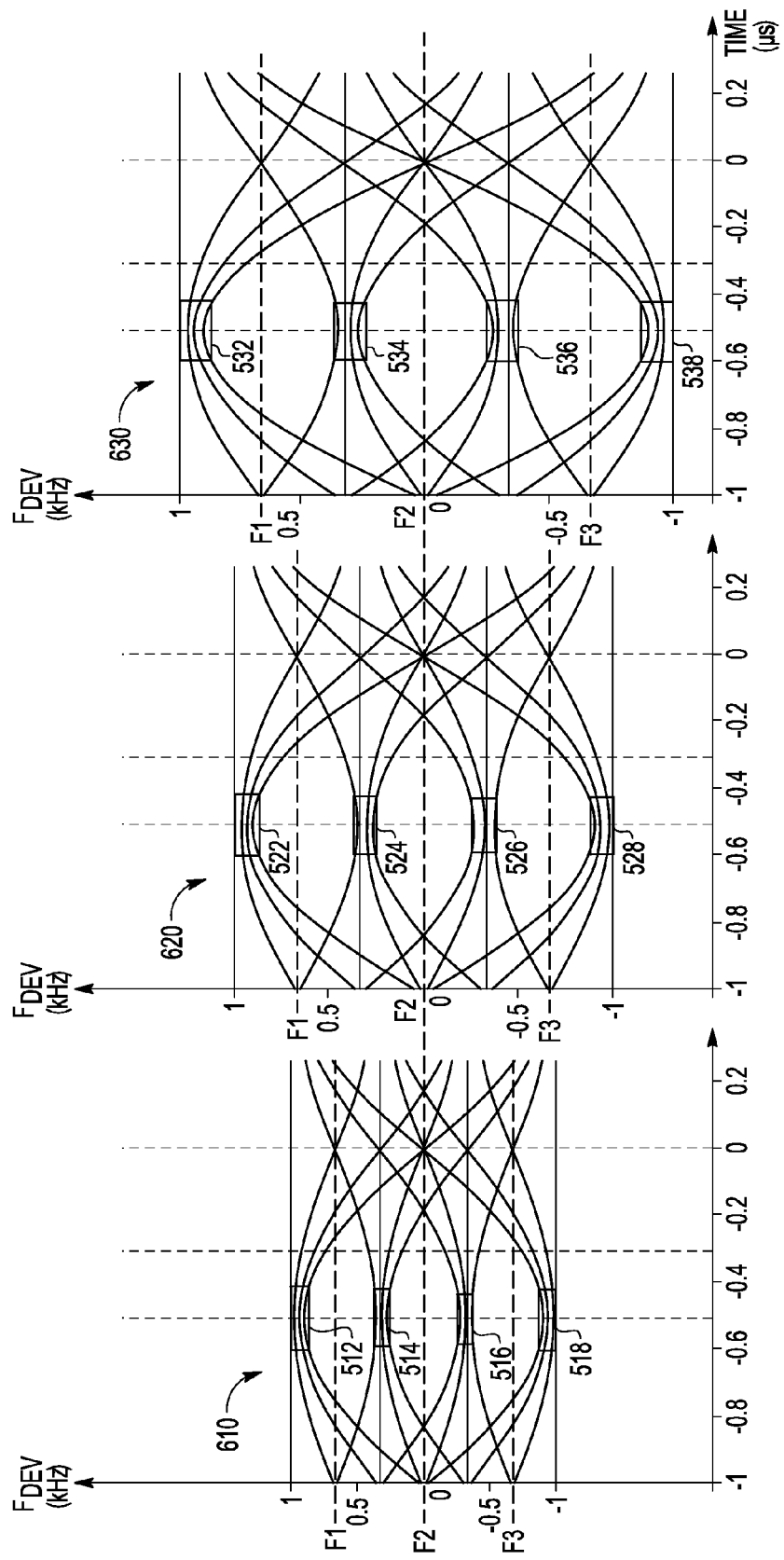
FIG. 6 illustrates a timing diagram of the operation of the 4GFSK symbol decoder of FIG. 2.

FIG. 6 illustrates a timing diagram of the operation of symbol decoder 200 of FIG. 2. As in FIG. 5, FIG. 6 illustrates three sets of waveforms, including a waveform set 610 corresponding to a 70% frequency deviation, a waveform set 620 representing nominal frequency deviation, and a waveform set 630 representing a 130% deviation. The horizontal and vertical axes are denominated and labeled as in FIG. 5. However FIG. 6 represents an adjustment of the nominal slicing levels by measurement of actual frequency deviations during the preamble as described with respect to FIG. 2 above. As can be seen in FIG. 6, slicing levels F1 and F3 are adjusted by the 70% factor to apply to waveform set 610 such that they are now in the "eye" and thus accurately discriminate their respective symbol levels. Likewise slicing levels F1 and F3 are adjusted by the 130% factor to apply to waveform set 630 such that they are now in the "eye" and thus accurately discriminate their respective symbol levels.

Figure 7:
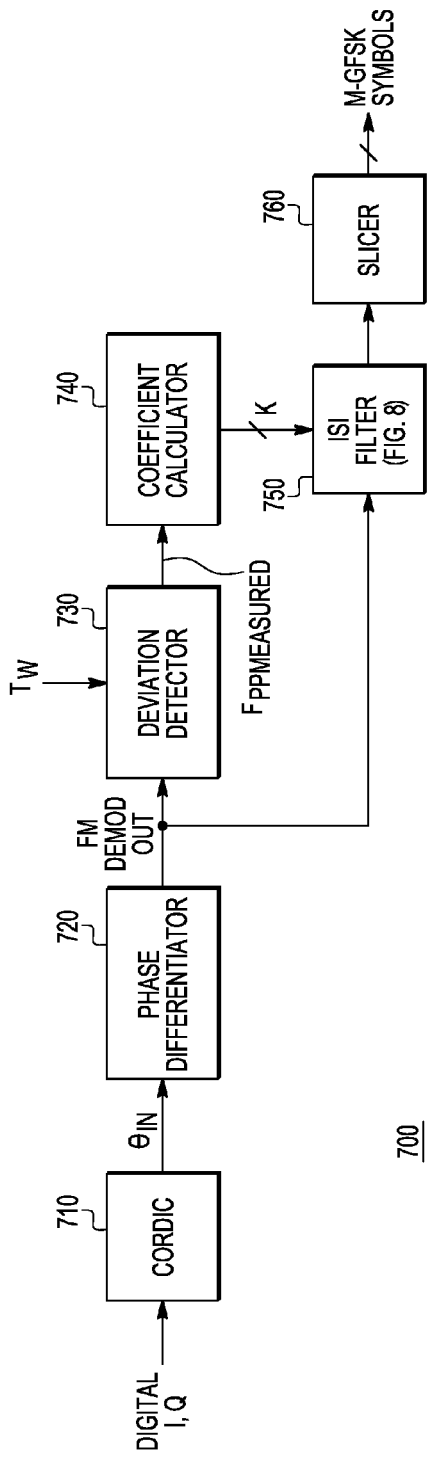
FIG. 7 illustrates in block diagram form a symbol decoder that may be used in the digital processor FIG. 1 in accordance with another embodiment.

FIG. 7 illustrates in block diagram form a symbol decoder 700 that may be used in the digital processor FIG. 1 in accordance with another embodiment. Symbol decoder 700 includes a CORDIC 710, a phase differentiator 720, a deviation detector 730, a coefficient calculator 740, an inter-symbol interference (ISI) filter 750, and a slicer 760. CORDIC 710 has an input for receiving the digital I and Q signals from ADC 118, and an output for providing the $\Theta_{IN}$ signal. Phase differentiator 720 has an input connected to the output of CORDIC 710 for receiving the $\Theta_{IN}$ signal, and an output for providing the FM DEMOD OUT signal. Deviation detector 730 has an input connected to the output of phase differentiator 220 for receiving the FM DEMOD OUT signal, a control input for receiving the $T_W$ signal, and an output. Coefficient calculator 740 has an input connected to the output of deviation detector 730, and an output for providing a coefficient labeled "K". ISI filter 750 has a signal input connected to the output of phase differentiator 720, a coefficient input connected to the output of coefficient calculator 740, and an output. Slicer 760 has an input connected to the output of ISI filter 750, and an output for providing the M-GFSK SYMBOLS.

In operation, symbol decoder 700 forms a portion of digital processor 124 that receives down converted digital I and Q signals, and in one supported mode of receiver 100 outputs GFSK symbols in one of four states. Symbol decoder 700 operates similarly to symbol decoder 200 of FIG. 2 described above. However symbol decoder 700 additionally includes ISI filter 750 to effectively adjust the slicing levels based on the frequency deviation of adjacent symbols. However instead of directly adjusting the slicing levels as in symbol decoder 200 above, symbol decoder 700 uses ISI filter 750 to adjust the frequency deviations based on pre- and post-symbol deviations to mitigate the effects of ISI. For example, filtering in the channel caused by, for example, multi-path propagation may increase ISI. Increased ISI may lower the frequency deviation which requires an adaptation of coefficient K to adapt the response of ISI filter 750 to achieve the optimum ISI cancellation. The reduced deviation can be measured in the same way as described with respect to FIG. 3, and this value can be used to adapt coefficient K either by a formula or a look-up table (LUT). Symbol decoder 700 uses the $F_{PPMEASURED}$ signal to adjust coefficient K used in ISI filter 750. Coefficient calculator 740 adjusts the nominal value of K based on the ratio of $F_{PPMEASURED}$ to $F_{PPNOMINAL}$ on a frame-by-frame basis. For example, symbol decoder 700 could use $F_{PPMEASURED}$ during the 0101 pattern in the preamble, during the synchronization (SYNC) word, during the ISI training sequence, or some combination of the three.

By including ISI filter 750, receiver 100 is able to decrease channel filter bandwidth requirements. For use in an MBUS-2013 system, receiver 100 is able to decrease the Eb/N0 requirement.

Figure 8:
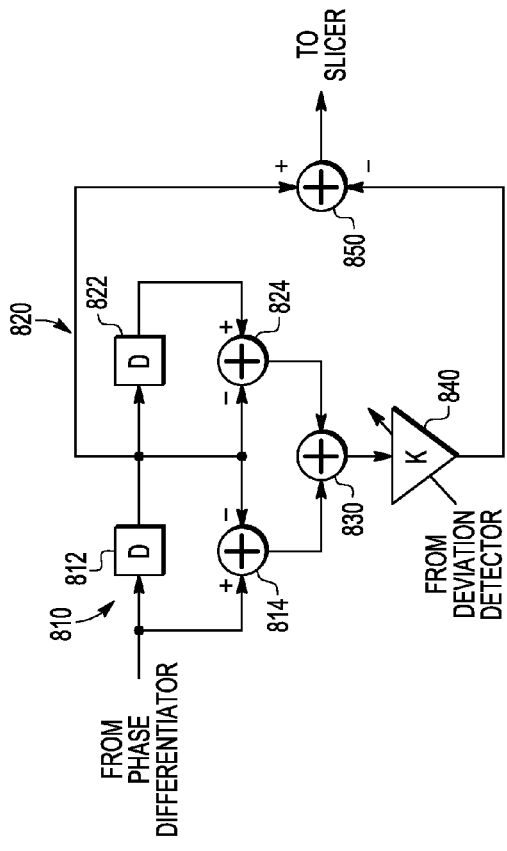
FIG. 8 illustrates in block diagram form the inter-symbol interference filter of FIG. 7.

FIG. 8 illustrates in block diagram form ISI filter 750 of FIG. 7. ISI filter 750 includes generally a post-cursor portion 810, a pre-cursor portion 820, a summing device 830, a variable multiplier 840, and a summing device 850. Post-cursor portion 810 includes a delay element 812 labeled "D" and a summing device 814. Delay element 812 has an input connected to the output of phase differentiator 720, and an output. Summing device 814 has a positive input connected to the output of phase differentiator 720, a negative input connected to the output of delay element 812, and an output. Pre-cursor portion 820 includes a delay element 822 and a summing device 824. Delay element 822 has an input connected to the output of delay element 812, and an output. Summing device 824 has a positive input connected to the output of delay element 822, a negative input connected to the output of delay element 812, and an output. Summing device 830 has a first input connected to the output of summing device 814, a second input connected to the output of summing device 824, and an output. Variable multiplier 840 has an input connected to the output of summing device 830, a coefficient input connected to the output of coefficient calculator 740, and an output. Summing device 850 has a positive input connected to the output of delay element 812, a negative input connected to the output of variable multiplier 840, and an output for providing a filtered version of FM DEMOD OUT to slicer 760.

ISI filter 750 is a 2-tap FIR filter that determines a frequency deviation by including pre- and post-cursor compensation. The input of delay element 812 represents a post-cursor sample, i.e., a sample one symbol time later than the current sample. The output of delay element 812 represents the current sample, i.e. the cursor. The output of delay element 822 represents the pre-cursor sample, i.e. a sample one symbol time earlier than the current sample. Summing device 814 determines the difference between the later sample and the current sample, and summing device 824 determines the difference between the earlier sample and the current sample. Summing device 830 adds these two differences together. Variable multiplier 840 multiplies the sum of these two differences by coefficient K, which summing device 850 then subtracts from the current sample to provide the adjusted FM DEMOD OUT signal. Thus ISI filter 750 compensates for the value of the FM DEMOD OUT signal in proportion (determined by coefficient K) to the inter-symbol differences, which correlate to the inter-symbol interference. In other embodiments, the ISI filter could take into account multiple earlier and later symbols controlling multiple coefficients. Also, the deviation detector could take several samples during a training sequence to improve the adaptation of these coefficients.

The above-disclosed subject matter is to be considered illustrative, and not restrictive, and the appended claims are intended to cover all such modifications, enhancements, and other embodiments that fall within the true scope of the claims. For example, various blocks described above can be implemented variously in hardware, in software running on a general-purpose data processor, or as illustrated by software or firmware running on a DSP. Moreover the two mechanisms illustrated in FIGS. 2 and 7 can be implemented individually or together. Also the symbol decoders described above can be applied to any multiple-level FSK system such as 4GFSK, 8GFSK, etc.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver comprising:
   an analog receiver having an input for receiving a radio frequency (RF) signal, and an output for providing a digital intermediate frequency signal; and
   a digital processor having an input for receiving said digital intermediate frequency signal, and an output for providing digital symbols, wherein said digital processor measures a peak-to-peak frequency deviation of said digital intermediate frequency signal, and performs a digital signal processing function on said digital intermediate frequency signal to provide said digital symbols based on said peak-to-peak frequency deviation so measured, wherein said digital processor adjusts a plurality of nominal slicing levels in response to said peak-to-peak frequency deviation so measured and a nominal peak-to-peak frequency deviation, said digital processor comprising:
   a slicing level calculator for receiving said peak-to-peak frequency deviation and a nominal peak-to-peak frequency deviation, and for providing a plurality of adjusted slicing levels, said slicing level calculator calculating said plurality of adjusted slicing levels by multiplying each of said plurality of nominal slicing levels by a ratio of said peak-to-peak frequency deviation to said nominal peak-to-peak frequency deviation; and
   a slicer coupled to said slicing level calculator for determining said digital symbols using said plurality of adjusted slicing levels.

2. The receiver of claim 1, wherein said digital processor further comprises:
   a coordinate rotation digital computer having an input for receiving said digital intermediate frequency signal, and an output for providing an instantaneous phase signal;
   a phase differentiator having an input coupled to said output of said coordinate rotation digital computer, and an output for providing a demodulated frequency signal; a deviation detector having an input coupled to said output of said phase differentiator, and an output for providing said measured frequency deviation.

3. The receiver of claim 2, wherein said deviation detector comprises:
   a filter having an input coupled to said output of said phase differentiator, and an output;

a high hold register having an input coupled to said output of said filter, and an output;

a low hold register having an input coupled to said output of said filter, and an output; and a subtractor having a first input coupled to said output of said high hold register, a second input coupled to said output of said low hold register, and an output for providing said measured frequency deviation.

4. The receiver of claim 2, wherein said slicing level calculator has a first input coupled to said output of said deviation detector, a second input for receiving said nominal peak-to-peak frequency deviation, and a third input for receiving said plurality of nominal slicing levels, wherein said slicing level calculator calculates said plurality of adjusted slicing levels by multiplying each of said plurality of nominal slicing levels by said ratio of said peak-to-peak frequency deviation to said nominal peak-to-peak frequency deviation.

5. The receiver of claim 1, wherein said digital symbols comprise a number of states greater than two.

6. The receiver of claim 5, wherein said RF signal comprises a four-level Gaussian frequency shift keying (4GFSK) signal, and said digital processor provides three adjusted slicing levels to determine whether said digital symbols are in one of four states.

7. The receiver of claim 1, wherein said digital processor measures said peak-to-peak deviation during a preamble period of said RF signal.

8. The receiver of claim 7, wherein said digital processor further measures said peak-to-peak deviation by averaging a plurality of peak-to-peak values during a corresponding plurality of time intervals during said preamble period.

9. The receiver of claim 1, wherein said digital processor performs said digital signal processing function by adjusting a coefficient in response to said peak-to-peak frequency deviation so measured, and filtering inter-symbol interference in said digital intermediate frequency signal using said coefficient.

10. The receiver of claim 9, wherein said digital processor comprises:

an inter-symbol interference filter for compensating for inter-symbol differences of temporally adjacent symbols based on said coefficient to provide a compensated frequency deviation signal; and a slicer having an input for receiving said compensated frequency deviation signal, and an output for providing said digital symbols.

11. The receiver of claim 10, wherein said inter-symbol interference filter comprises:

a post-cursor portion for determining a first difference in frequency between a subsequent symbol and a current symbol;

a pre-cursor portion for determining a second difference in frequency between a prior symbol and said current symbol;

a first summing device for forming a sum of said first and second differences in frequency;

a variable multiplier for multiplying said sum by said coefficient to provide an adjustment signal; and a second summing device for subtracting said adjustment signal from said current symbol to provide said compensated frequency deviation signal.

12. The receiver of claim 9, wherein said digital processor measures said peak-to-peak frequency deviation during a preamble period of said RF signal.

13. The receiver of claim 9, wherein said digital processor measures said peak-to-peak frequency deviation during a synchronization word.

14. A method comprising:

receiving an input signal;

converting said input signal into a demodulated frequency signal, wherein a magnitude of said demodulated frequency signal represents a frequency of said input signal;

measuring a peak-to-peak frequency deviation in said demodulated frequency signal during a time window; and performing a digital signal processing function on said demodulated frequency signal to provide digital symbols based on said peak-to-peak frequency deviation so measured, wherein said performing comprises:

adjusting a plurality of nominal slicing levels using a slicing level calculator based on said peak-to-peak frequency deviation to obtain a corresponding plurality of adjusted slicing levels, wherein said adjusting comprises calculating said plurality of adjusted slicing levels by multiplying each of said plurality of nominal slicing levels by a ratio of said peak-to-peak frequency deviation to a nominal peak-to-peak frequency deviation;

and slicing in a slicer said demodulated frequency signal using said plurality of adjusted slicing levels to obtain a multi-bit symbol.

15. The method of claim 14, wherein said measuring comprises averaging a plurality of peak-to-peak deviations measured over a corresponding plurality of time windows.

16. The method of claim 14, wherein said performing comprises:

adjusting a coefficient in response to said peak-to-peak frequency deviation so measured;

and filtering inter-symbol interference in said demodulated frequency signal using said coefficient.

17. The method of claim 14, wherein said measuring comprises:

sampling a high frequency deviation in said demodulated frequency signal during said time window;

sampling a low frequency deviation in said demodulated frequency signal during said time window; and subtracting said low frequency deviation from said high frequency deviation to obtain said peak-to-peak deviation.

* * * * *